(12) United States Patent
Kattukaran et al.

(10) Patent No.: US 7,082,320 B2
(45) Date of Patent: Jul. 25, 2006

(54) INTEGRATION OF WIRELESS LAN AND CELLULAR DISTRIBUTED ANTENNA

(75) Inventors: Paul Kattukaran, Singapore (SG); Tien Yu Ong, Singapore (SG)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 434 days.

(21) Appl. No.: 10/234,082

(22) Filed: Aug. 30, 2002

(65) Prior Publication Data

US 2003/0087672 A1 May 8, 2003

Related U.S. Application Data

(60) Provisional application No. 60/317,291, filed on Sep. 4, 2001.

(51) Int. Cl.
*H04M 1/00* (2006.01)
(52) U.S. Cl. .............. 455/562.1; 455/426.2; 455/446; 455/554.2; 370/338
(58) Field of Classification Search ............ 455/456.1, 455/426.2, 41.2, 131, 133, 124, 562.1; 370/338, 370/330
See application file for complete search history.

(56) References Cited

U.S. PATENT DOCUMENTS

| | | | |
|---|---|---|---|
| 5,283,789 A * | 2/1994 | Gunnarsson et al. ........ | 370/490 |
| 5,321,736 A | 6/1994 | Beasley ........................ | 455/11 |
| 5,564,121 A | 10/1996 | Chow et al. .................. | 455/25 |
| 5,923,702 A * | 7/1999 | Brenner et al. ............. | 375/133 |
| 6,223,055 B1 * | 4/2001 | Cyr ............................. | 455/555 |
| 6,243,581 B1 * | 6/2001 | Jawanda .................. | 455/432.2 |
| 6,405,018 B1 * | 6/2002 | Reudink et al. .............. | 455/20 |
| 6,497,656 B1 * | 12/2002 | Evans et al. ................ | 600/300 |
| 6,587,479 B1 * | 7/2003 | Bianchi et al. ............. | 370/487 |
| 6,681,259 B1 * | 1/2004 | Lemilainen et al. ........ | 709/250 |
| 6,771,933 B1 * | 8/2004 | Eng et al. .................. | 455/41.2 |
| 6,801,767 B1 * | 10/2004 | Schwartz et al. ........ | 455/426.2 |
| 2002/0032004 A1 * | 3/2002 | Widrow ...................... | 455/22 |
| 2002/0193075 A1 * | 12/2002 | Lohr ........................... | 455/61 |
| 2004/0102196 A1 * | 5/2004 | Weckstrom et al. ...... | 455/456.1 |
| 2004/0170154 A1 * | 9/2004 | Carter et al. ................ | 370/338 |
| 2004/0213178 A1 * | 10/2004 | Hood, III .................... | 370/328 |
| 2005/0181723 A1 * | 8/2005 | Miller et al. ............... | 455/12.1 |

FOREIGN PATENT DOCUMENTS

WO  WO 01/59874 A1  8/2001

* cited by examiner

*Primary Examiner*—Joy K. Contee

(57) ABSTRACT

A system and method for supporting wireless in-building communications uses a wireless local area network access point, a cellular distributed antenna system, and a cellular radio base station coupled to the cellular distributed antenna system. The cellular radio base station provides cellular communication service via the cellular distributed antenna system. A coupler couples the wireless local area network access point to the cellular distributed antenna system in reverse mode, such that the wireless local area network access point provides wireless local area network service via the cellular distributed antenna system.

5 Claims, 3 Drawing Sheets

INTEGRATION OF WIRELESS LAN AND CELLULAR DISTRIBUTED ANTENNA

RELATED APPLICATION(S)

This application claims priority from and incorporates herein by reference the entire disclosure of U.S. Provisional Application Ser. No. 60/317,291 filed Sep. 4, 2001.

BACKGROUND OF THE INVENTION

1. Technical Field of the Invention

The present invention relates in general to the implementation of wireless local area networks, and in particular to integrating a wireless local area network and a cellular distributed antenna system.

2. Description of Related Art

Most of the offices in a high rise building already have wired local area networks (LAN) for their day-to-day activities. The recent trend for many offices is to provide wireless connections for PCs, Laptops and other computing devices. The wireless connections provide the users with greater mobility both within and outside the office. This greater mobility is partly being achieved at present by using wireless LAN (WLAN) access points and WLAN cards installed in the PC/Laptops.

In order to provide sufficient WLAN coverage in an office, usually one needs to install two or more access points because of line of sight (LOS) constraints. That is to say, two or more wireless access points are needed because the PC/Laptop needs to have a direct, unobstructed path to a wireless access point. The amount of capacity needed by most offices, however, can be satisfied with one wireless access point. The installation of an excess number of access points, i.e., capacity, may result in unnecessary investment costs for the sake of coverage. It would be more cost efficient and practical if one had the means of reducing the large capital investment and the time to conduct a thorough radio propagation study and time for the WLAN access point installation on every floor in the building.

SUMMARY OF THE INVENTION

The present invention comprises a method and system for integrating a wireless local area network and a cellular distributed antenna system. In one embodiment, a wireless in-building communication system includes a wireless local area network access point, a cellular distributed antenna system, and a cellular radio base station coupled to the cellular distributed antenna system. The cellular radio base station provides cellular communication service via the cellular distributed antenna system. The system also includes a coupler for coupling the wireless local area network access point to the cellular distributed antenna system in reverse mode. As a result, the wireless local area network access point is able to provide wireless local area network service via the cellular distributed antenna system.

In another embodiment, a method for integrating a wireless local area network with a cellular distributed antenna system involves providing a wireless local area network access point, providing a cellular distributed antenna system, and coupling the wireless local area network access point to the cellular distributed antenna system using a coupler in reverse mode.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Embodiments of the present invention relate to integrating WLAN into a cellular in-building infrastructure, i.e., cellular distributed antenna system (DAS), on a floor-by-floor basis. Most existing buildings typically require two or more stand-alone systems: at least one for providing the cellular coverage and at least one for providing the WLAN coverage. In addition, at least two or more stand-alone access points are typically installed on each floor. Also, a large amount of time is spent on radio frequency (RF) planning and surveying. Other shortcomings include additional cabling and fixtures in the office, higher RF radiation exposure for the personnel, and interference to adjacent access points, floors, and buildings. Finally, maintenance and reliability issues may arise due to the number of access points.

By integrating the WLAN access points into the existing in-building DAS, most if not all of the above problems can be solved. The in-building DAS enables and provides reliable and enhanced voice and data quality that meet the increasing demands and requirements by the end-users.

Figure 1:
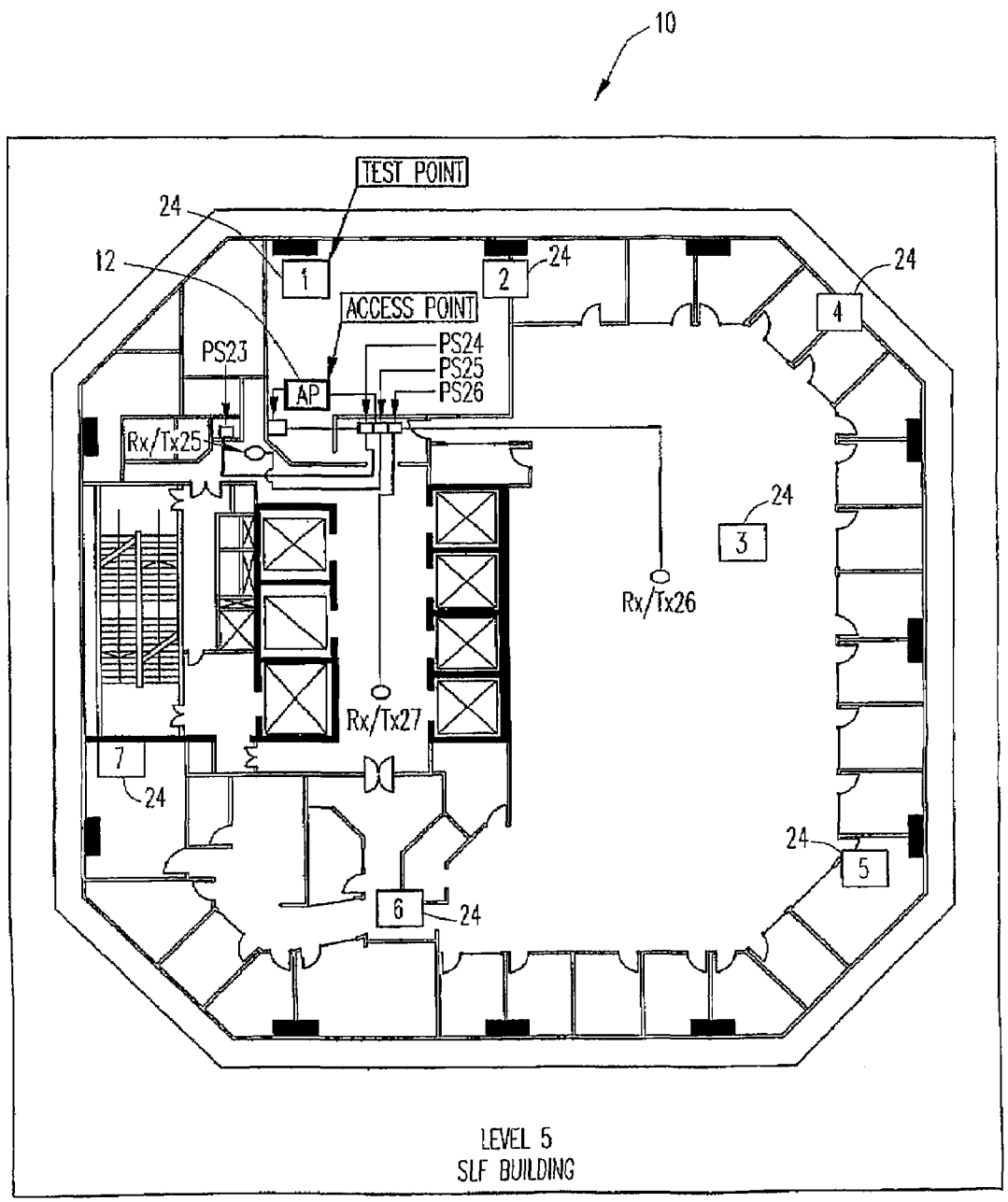
FIG. 1 is a schematic illustration of a building floor configuration having an integrated WLAN access point and cellular distributed antenna system in accordance with one embodiment of the present invention.

Reference is now made to the drawings, wherein like reference characters denote like or similar parts throughout the various figures. Turning now to FIG. 1, there is shown a schematic illustration of a building floor configuration 10 having an integrated WLAN access point AP and cellular DAS in accordance with one embodiment of the present invention. The DAS includes a plurality of antennas Rx/Tx25, Rx/Tx26, and Rx/Tx27 connected to a radio base station (RBS), not expressly shown. The antennas Rx/Tx25, Rx/Tx26, and Rx/Tx27 of the DAS are connected to the RBS via a plurality of power splitters PS23, PS24, PS25, and PS26. In addition, an access point AP 12 is connected to the DAS using a coupler (e.g., 6 dB) in reverse mode, which directs maximum power towards the antenna and provides the required isolation for the cellular base station. This approach of installing the coupler in the reverse mode is contrary to most existing installation manuals and to the practice of the communications industry in general. In accordance with the invention, transmission of a WLAN-RF signal can be through new media such as, for example, a passive coaxial feeder cable; a radiating cable (also referred to as "leaky feeder"); and/or an active fibre DAS using fibre optic cable.

Figure 2:
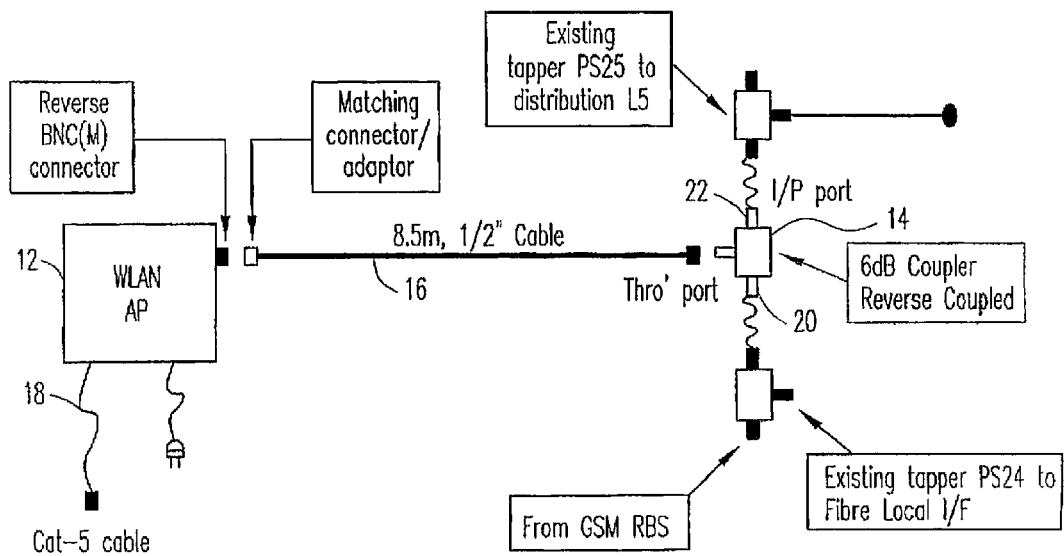
FIG. 2 is a block diagram illustrating a more detailed configuration for the integrated system of the present invention depicted in FIG. 1.

Referring now to FIG. 2, there is shown a block diagram illustrating a more detailed configuration for the integrated system of the present invention depicted in FIG. 1. As can be seen, the WLAN access point AP 12 is connected to the building level-5 DAS using a the coupler 14 in reverse mode to provide maximum isolation to the RBS by using a ½" coax cable (8.5 m) 16. A data cable 18 is tapped from the nearby LAN data port and connected to the access point AP 12, which is powered by a standard AC-DC power adapter that is supplied together with the access point AP 12. The coupler 14 is coupled to the RBS via a through port 20 and at least one power splitter PS24. In addition, the coupler 14 is coupled to the antennas in the DAS via an input port 22 and at least one power splitter PS25.

To demonstrate the performance of the present invention, performance data from tests of certain WLAN configurations is set forth below. First, a test of a conventional WLAN access point AP (i.e., using an access point that was entirely independent of the existing DAS) was performed. Data collected at various test points 24, as shown in FIG. 1, is summarized in Table 1. The data was collected by using a single access point AP with a stand alone (direct) AP 12, a standard dipole antenna supplied with the AP 12, and a laptop computer with a WLAN card in the PCMCIA slot.

TABLE 1

Performance Data
WLAN Data

WLAN round trip test 100 times (AP direct)

| Loc. | GSM Rx Lev | Ave (mSec) | Timeouts | Data Rate (Mb/s) | Sig. Qual |
|---|---|---|---|---|---|
| 1 | −75 | 3 | 0 | 11 | Excellent |
| 2 | −62 | 3 | 0 | 11 | Excellent |
| 3 | −45 | 3 | 0 | 5.5 | Excellent |
| 4 | −74 | 3 | 0 | 11 | Good |
| 5 | −78 | 15 | 5 | 1 | Poor |
| 6 | −74 | 6 | 0 | 1 | poor |
| 7 | −82 | — | All | — | Out of range |

Poor performance at locations 5, 6, and 7 indicates that this test floor needs one more access point AP to provide good WLAN coverage.

Figure 3:
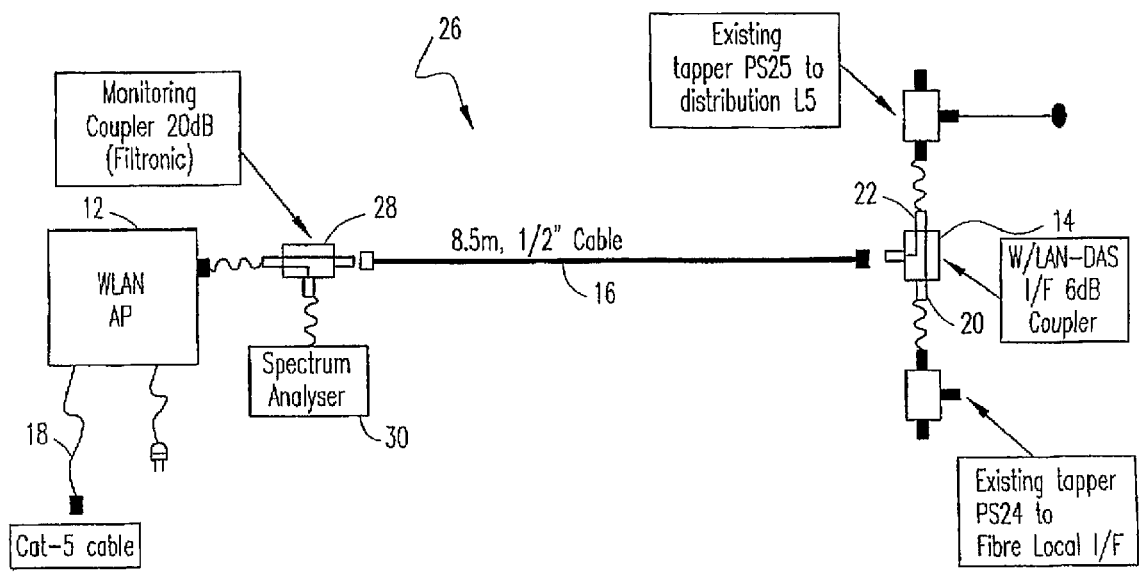
FIG. 3 is a block diagram illustrating a configuration for performing a spectrum analysis test relating to the present invention.

Referring now to FIG. 3, there is shown a block diagram illustrating a configuration 26 for performing a spectrum analysis test relating to the present invention. The test configuration 26 is essentially the same as the configuration shown in FIG. 2, except that the test configuration 26 further includes a monitoring coupler (e.g., 20 dB) 28 between the WLAN access point AP 12 and the coaxial cable 16. The monitoring coupler 28 is further coupled to a spectrum analyzer 30. Table 2 summarizes the test results for the spectrum of only the DAS, such that the input of the monitoring coupler 28 is terminated as shown in FIG. 3.

TABLE 2

DAS spectrum - direct

| S/N | Freq. (GHz) | Ampl. (dBm) + 20 | Remarks |
|---|---|---|---|
| 1 | 1.821 | −9.16 | GSM 1800 |
| 2 | 0.952 | −18.6 | GSM 900 |

Table 3 summarizes the test results for the spectrum of the DAS with the WLAN integrated through the coupler 14 as the interfacing element.

TABLE 3

| S/N | Freq. (GHz) | Ampl. (dBm) + 20 | Remarks |
|---|---|---|---|
| 1 | 2.429 | −8.4 | WLAN |
| 2 | 1.821 | −9.01 | GSM 1800 |
| 3 | 0.952 | −18.42 | GSM 900 |

A comparison of the data in Tables 2 and 3 demonstrates that no spurious emission is generated and that the link performance (data throughput) is quite satisfactory.

Table 4 includes a summary of performance data for the system with the coupler 14 interfacing the WLAN with the DAS.

TABLE 4

WLAN Data collected on 17 Jul. 2001

WLAN round trip test 100 times (AP in DAS with 6 dB coupler as I/F)

| Loc. | GSM Rx Lev | Ave (mSec) | Time Outs | Data Rate (Mb/s) | Sig. Qual |
|---|---|---|---|---|---|
| 1 | −75 | 8 | 0 | 11 | Good |
| 2 | −62 | 6 | 0 | 11 | excellent |
| 3 | −45 | 3 | 0 | 11 | excellent |
| 4 | −74 | 6 | 0 | 5.5–11 | good |
| 5 | −78 | 18 | 1 | 5–5–11 | fair |
| 6 | −74 | 11 | 0 | 5.5–11 | good |
| 7 | −82 | — | All | — | out of range |

It should be noted that the poor performance at test location 7 is due to a lack of cellular in-building coverage in that area. Proper RF design by, for example, shifting the antenna Rx/Tx27 to a more optimum position or adding one more antenna would solve this problem. In any event, the test results show that a cellular DAS and WLAN integration can be successful when using a coupler in reverse mode as the interfacing element.

By integrating the WLAN to the cellular DAS in accordance with the invention, only one access point AP 12 is needed to cover one floor based on the coverage requirements and capacity needs for less than fifty WLAN users, and provided that the cellular DAS covers all of the required floor areas with −75 dBm or better. Without such an integration, two or more AP modules would be needed to cover the same office floor. It will be appreciated that the number of APs 12 needed in an integrated solution depends largely on the floor layout and/or the capacity requirements of the WLAN, although it will be recognized that the number of APs 12 can generally be reduced by using an integrated solution. In addition, with the integrated solution, there is no need for any WLAN boosters for single floor coverage. It is also possible to interface multiple APs 12 to the horizontal distribution of the DAS on the same floor if different channels (0–13) are set for each AP 12.

In accordance with the present invention, the number of access points may be reduced to a minimum per floor, thereby allowing for a reduced investment. The integration also "enhances the value" of the DAS, because the in-building infrastructure can be reused for providing and extending the WLAN coverage. Another benefit is that, by integrating DAS with WLAN, one can minimize the time needed for RF design and survey work for WLAN. There is also low RF radiation from the DAS for WLAN as there are a larger number of distributed antennas. Moreover, unnecessary wiring and fixing of additional WLAN antennas in the ceiling and/or walls is eliminated. Finally, interference levels to adjacent floors and adjacent buildings are kept to a minimum.

Figure 4:
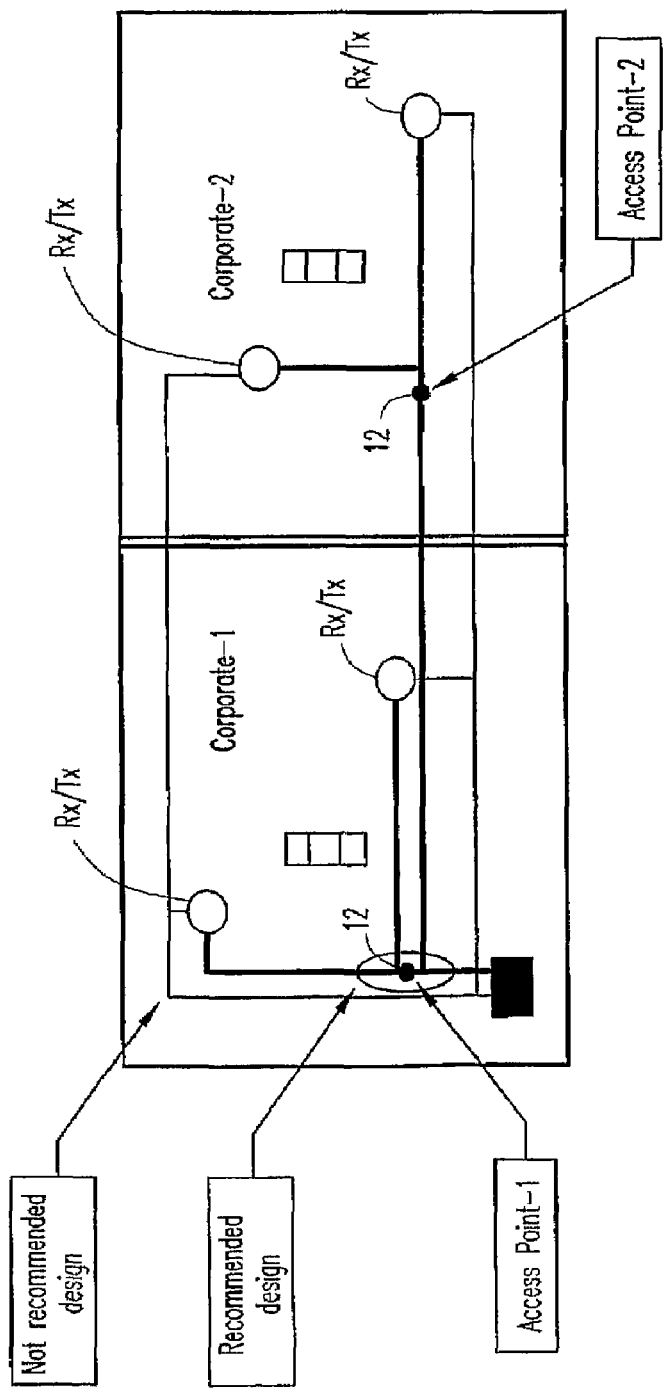
FIG. 4 illustrates the concept of taking into consideration the location of different groups of users when designing the distributed antenna system.

In accordance with another embodiment of the invention, by taking into consideration the location of different group of users when designing the DAS, one may be able to determine the modularity required for the distribution of the signal to segregate different companies/corporations sharing the same floor. FIG. 4 illustrates this concept.

It should be clear that the present invention can be used for WLAN subsystem integration to cellular DAS at any location throughout the world and is applicable for any cellular DAS that is integrated with any WLAN access points using a coupler or tapper in reverse mode.

The DAS encompasses a distribution of passive antennas or radiating cable inside any category of building (private, public, or other) such as hotels, restaurants, offices, hospitals, shopping centers, warehouses, underground railway stations and tunnels, offshore platforms, and others using for example:

a. normal RF coaxial cable of ½", ⅞", 1¼", or of any size and length from any manufacturer or supplier;

b. fire retardant coaxial cable of ½", ⅞", 1¼", or of any size and length from any manufacturer or supplier;

c. radiating/leaky cable of any dimension ½", ⅞", 1¼", or of any size and length from any manufacturer or supplier; or d. active system on fibre optical cable of any size and length from any manufacturer or supplier.

The invention can be used in connection with any WLAN system/subsystem, or similar system, available at present or to be available in the future, working on 2.4–2.5 GHz radio frequency bands adhering to any standard, regardless of manufacturer, vendor, and/or supplier.

Finally, the invention can use a coupler or tapper in reverse mode. Standard couplers/tappers are usually marked with arrow markings to indicate the proper direction for the inputs and outputs in order to direct the signal as required by the in-building DAS design.

In the WLAN-cellular DAS integration of the present invention, these couplers are used in "reverse mode" for at least the following reasons:

i. maximize the WLAN signal directed towards the distributed antenna on the floor;

ii. maximize the isolation between the WLAN AP and the cellular RBS; and/or iii. minimize insertion loss to the existing or new cellular in-building DAS design.

The term "reverse mode" is generally used herein to indicate that the signal from the WLAN access point AP 12 is connected to the standard coupled port and the output through port (standard through port) is connected to the RBS side and where the input (standard input port) is connected to the distributed antenna side.

The "reverse mode" functionality can be achieved by re-labeling the ports to make the coupler different from the one used in "reverse mode" in the above-referenced configurations by changing the labeling on the coupler, or by giving a new name to this particular product to achieve the same functionality.

Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed:

1. An in-building communication system for providing both cellular communication services and wireless local area network (WLAN) services, comprising:

a WLAN access point for providing a mobile terminal with wireless access to a local area network;

a cellular distributed antenna system;

a cellular radio base station coupled to said cellular distributed antenna system for providing cellular communication service via said cellular distributed antenna system; and a reverse coupler for coupling the wireless local area network access point to the cellular distributed antenna system in reverse mode, wherein an input port of the coupler is connected to the distributed antenna system, an output through port of the coupler is connected to the radio base station, and a standard coupled port of the coupler is connected to the WLAN access point, wherein the WLAN access point provides WLAN service via said cellular distributed antenna system.

2. The system of claim 1, wherein the reverse mode of the coupler provides at least one of:

substantially maximizing a WLAN signal directed toward the distributed antenna system;

substantially maximizing an isolation between the WLAN access point and the cellular radio base station; and substantially minimizing an insertion loss to the cellular distributed antenna system.

3. A method of integrating a wireless local area network with a cellular distributed antenna system, comprising:

providing a wireless local area network (WLAN) access point;

providing a cellular distributed antenna system; and coupling a cellular radio base station to the cellular distributed antenna system for providing cellular communication service via the cellular distributed antenna system; and coupling the wireless local area network access point to the cellular distributed antenna system using a coupler in reverse mode, said coupling step including;

connecting the distributed antenna system to an input port of the coupler, and connecting the WLAN access point to a standard coupled port of the coupler;

wherein the cellular distributed antenna system provides a mobile terminal with both cellular communication services and WLAN services.

4. An in-building communication system for providing wireless local area network (WLAN) service, comprising:

a wireless local area network (WLAN) access point;

a cellular distributed antenna system; and a reverse coupler for coupling the wireless local area network access point to the cellular distributed antenna system in reverse mode, wherein an input port of the coupler is connected to the distributed antenna system, and a standard coupled port of the coupler is connected to the WLAN access point.

wherein the WLAN access point provides WLAN service via the cellular distributed antenna system.

5. The system of claim 4, wherein the system also provides cellular radio telecommunication service in the same area as the WLAN services, and the system further comprises:

a cellular radio base station coupled to the cellular distributed antenna system via an output through port of the reverse coupler, wherein the radio base station provides cellular radio telecommunication service via the cellular distributed antenna system.

\* \* \* \* \*

UNITED STATES PATENT AND TRADEMARK OFFICE
CERTIFICATE OF CORRECTION

PATENT NO. : 7,082,320 B2 Page 1 of 1
APPLICATION NO. : 10/234082
DATED : July 25, 2006
INVENTOR(S) : Kattukaran et al.

It is certified that error appears in the above-identified patent and that said Letters Patent is hereby corrected as shown below:

In Column 6, Line 23, in Claim 3, after "antenna system:" delete "and".

In Column 6, Line 48, in Claim 4, after "point" delete "." and insert -- , --, therefor.

Signed and Sealed this

Eighteenth Day of December, 2007

JON W. DUDAS
*Director of the United States Patent and Trademark Office*